United States Patent [19]

Madill

[11] Patent Number: 5,087,091
[45] Date of Patent: Feb. 11, 1992

[54] MULTIPLE PURPOSE VEHICLE

[75] Inventor: Kent W. Madill, Rochester, Mich.

[73] Assignee: General Motors Corporaiton, Detroit, Mich.

[21] Appl. No.: 684,723

[22] Filed: Apr. 15, 1991

[51] Int. Cl.⁵ .......................... B62D 33/04; B60P 7/02
[52] U.S. Cl. ...................................... 296/26; 296/99.1
[58] Field of Search ................................. 296/26, 99.1

[56] References Cited

U.S. PATENT DOCUMENTS

| | | | |
|---|---|---|---|
| 1,242,035 | 10/1917 | Pierson et al. | 296/26 |
| 1,272,620 | 7/1918 | Carlson | 296/26 |
| 1,655,797 | 1/1928 | Peck | 296/26 |
| 4,875,731 | 10/1989 | Ruiz | 296/26 X |

Primary Examiner—Dennis H. Pedder
Attorney, Agent, or Firm—Edward J. Biskup

[57] ABSTRACT

A vehicle having a body section convertible between a closed van type configuration having an enclosed cargo space and a pickup truck configuration having an open cargo bed. An enclosure member is pivotally connected to the body section for pivotal movement between a closed and an open position, and a tailgate is pivotally connected to a rear of the body section for pivotal movement between a raised and a lowered position. When the enclosure member in the closed position and the tailgate is in the raised position, they cooperate to define the enclosed cargo space of the van configuration. To convert the vehicle to the pickup configuration, the tailgate is pivoted to the lowered position and the enclosure section is pivoted to the open position, with the result that the enclosure member serves as a cargo carrying member and thereby increases the longitudinal length of the cargo bed.

8 Claims, 2 Drawing Sheets

MULTIPLE PURPOSE VEHICLE

BACKGROUND OF THE INVENTION

This invention relates generally to motor vehicles convertible between different configurations and more specifically to motor vehicles which are convertible between a closed configuration having an enclosed cargo bed and a pickup truck configuration having an open cargo bed.

Light weight cargo loads are typically hauled in closed van type vehicles or in pickup trucks. Pickup trucks commonly have a cab, which is a covered passenger seating area, and an open bed for hauling cargo. Van type vehicles, on the other hand, usually have their cargo area completely enclosed by a roof as well as sides and a rear closure member commonly higher than the tailgate of a pickup truck.

It is well known, that both vans and pickup trucks have certain advantages. For example, pickup trucks are able to carry cargo which extends above the side walls of the cargo bed and may be loaded more easily than the enclosed cargo area of a van. Vans, on the other hand, have the advantage of providing security and shelter for the cargo in an enclosed cargo area.

It is also known to combine the attributes of pickup trucks and vans in one vehicle. Caps which fit over the open bed of a pickup truck are one common way to provide shelter and security to cargo in a pickup truck. However, truck caps are often difficult for one person to attach or remove and require a storage area when not in use.

Another manner of providing the attributes of a van and pickup truck can be found in U.S. Pat. No. 4,626,024 issued to Jack C. Swann on Dec. 2, 1986. The Swann truck comprises a fixed body section sheltering a forward portion of the cargo bay and a movable body section positioned above a rear portion of the cargo bay. A track is provided on the fixed body section and runners, mounted on the movable body section, are located in the track for allowing movement of the movable body section along the track. When the truck is in the van configuration, both the fixed body section and the movable body section shelter the entire cargo bay. When the truck is in the pickup configuration the movable body section is positioned forwardly above the fixed body section to allow a rear section of the truck to become an open cargo bed.

One problem, however, with Swann's vehicle is that it makes no use of the movable body section for supporting any of the cargo when in the pickup truck configuration.

To this end, the present invention is directed to a vehicle which is convertible between a closed van configuration having an enclosed cargo space and a pickup truck configuration having an open cargo bed and which uses a movable section of the van configuration to increase the area of the cargo bed when the van is converted to the pickup truck configuration.

Some other patents showing multi-purpose vehicles which are convertible from one configuration to another, but in a manner different than that provided by the present invention are as follows:

U.S. Pat. No. 4,335,916 issued on June 22, 1982
U.S. Pat. No. 4,630,855 issued on Dec. 23, 1986
U.S. Pat. No. 4,659,136 issued on Apr. 21, 1987

SUMMARY OF THE INVENTION

An object of the present invention it to provide a new and improved vehicle which is convertible between a configuration having an enclosed cargo space and a configuration having an open cargo bed increased in length for carrying additional cargo.

Another object of the present invention is to provide a new and improved vehicle which is convertible between a closed van configuration and an open pickup truck configuration and which permits the vehicle to provide an open cargo bed having increased cargo capacity when in the pickup truck configuration.

Still another object of the present invention is to provide a new and improved vehicle which is convertible between a van configuration having an enclosed cargo space and a pickup truck configuration having an open cargo bed and which has an enclosure section that pivots from a closed position when in the van configuration to an open position in the pickup truck configuration so as to expand the cargo-carrying area of the vehicle.

The present invention meets the above stated objects by providing a vehicle which includes a body comprising a floor portion, a pair of body side walls, an enclosure member, tailgate, and a roof section connected to the body side walls. The enclosure member is pivotally connected to a rear portion of the side walls for pivotal movement between a closed position wherein the vehicle serves as an open van and an open position wherein the vehicle serves as an open pickup truck. The enclosure member is formed with a pair of side walls and an interconnecting roof portion that are contiguous with the side walls and the roof section, respectively, of the vehicle when the latter is in the van configuration. Thus, when the enclosure member is in the closed position relative to the body section and the tailgate is in the raised position, the vehicle assumes the van configuration. To transform the van to the pickup truck configuration, the tailgate pivots downwardly from the raised position to the lowered position and the enclosure section pivots from the closed position to the open position. The enclosure section in the open position cooperates with the floor portion to provide the open cargo bed of increased load-carrying capacity for the pickup truck configuration. To return the vehicle to the van configuration, the enclosure section is pivoted to the closed position and the tailgate is moved to the raised position.

Other objects and features of the present invention will become apparent to those skilled in the art from a reading of the following detailed description of a preferred embodiment of the invention as illustrated in the accompanying drawings in which:

DETAILED DESCRIPTION OF THE PREFERRED EMBODIMENT

Figure 1:
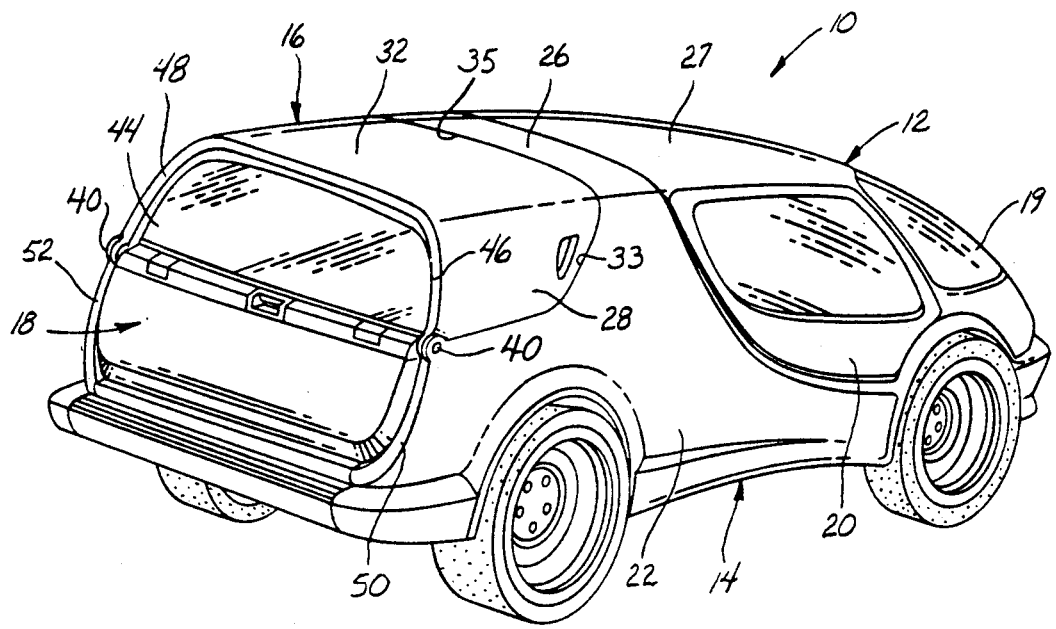
FIG. 1 is a perspective view of the rear of a vehicle according to the present invention that is convertible from a closed van type vehicle as shown to an open pickup truck configuration.
Figure 2:
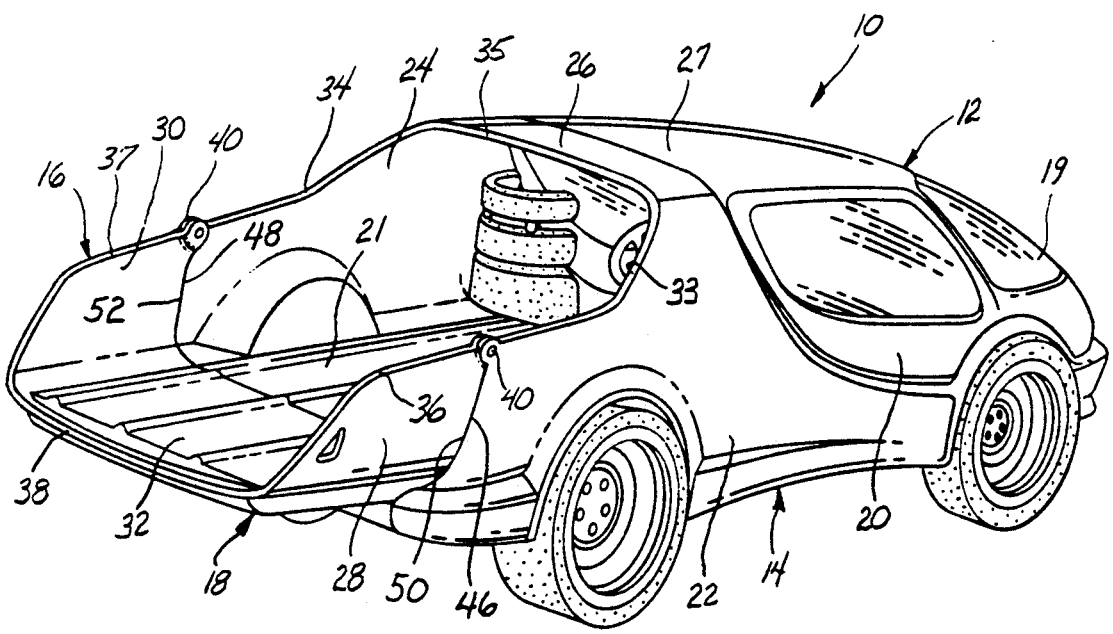
FIG. 2 is is a view similar to that shown in FIG. 1 but shows the vehicle in the pickup truck configuration by having an enclosure member incorporated therewith moved to the open position shown.

Referring now to the drawings and more particularly FIGS. 1 and 2 thereof, a vehicle 10 is shown which is adapted to be converted from the closed van type configuration shown to an open pickup truck configuration. In general, the vehicle 10 includes a body which comprises a cab section 12, a rear body section 14, an enclosure member 16 and a tailgate 18. The cab section 12 is composed of the usual windshield 19, side doors (one of which only is shown and identified by the reference numeral 20). The rear body section 14 includes a body floor portion 21, a pair of side walls 22 and 24, and a roof 26 which can be integral with the roof 27 of the cab section 12. The enclosure member 16 includes a pair of side wall portions 28 and 30 and a roof portion 32. The enclosure member 16 is pivotal between a closed position shown in FIGS. 1 and 3 to an open position shown in FIGS. 2 and 5. The tailgate 18 is also pivotally connected to the vehicle body for pivotal movement between a raised position seen in FIGS. 1 and 3 and a lowered position wherein it extends substantially horizontally rearwardly from the body.

FIG. 1 shows the vehicle 10 in the van configuration with the enclosure section 16 in the closed position and the tailgate 18 in the raised position. In this configuration, the body section 14, the enclosure member 16 and the tailgate 18 cooperate to define an enclosed cargo space within the vehicle. FIG. 2 shows the vehicle 10 in the pickup truck configuration with the enclosure member 16 in the open position and the tailgate 18 in the lowered position. In this configuration, the body section 14 and the enclosure section 18 cooperate to provide an open cargo bed. As will be more fully explained hereinafter, the enclosure member 16 is adapted to pivot from the closed position (the van configuration) to the open position (the pickup truck configuration) to provide the open cargo bed. Conversely, the enclosure member 16 can be pivoted from the open position to the closed position to provide the enclosed cargo space.

Figure 5:
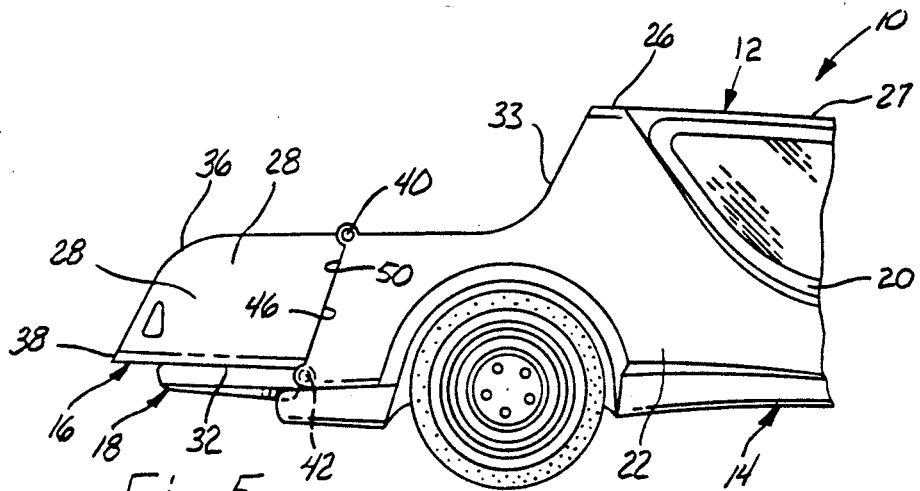
FIG. 5 is a view similar to that seen in FIG. 4 but shows of the vehicle of the present invention as seen in FIG. 2, with the enclosure member in the fully open position.

More specifically the rear body section 14 is located directly behind the cab section 12 which includes the usual driver and passenger seating areas. The floor portion 21 of the body section 14 is substantially horizontal and part of the floor (not shown) in the cab section 12 and is bounded on opposite sides by the laterally spaced side walls 22 and 24. The roof portion 26 is integrally formed with the forward portions of the side walls 22 and 24 so that together they provide as seen in FIGS. 2 and 5 a cut-out section at the rear of the vehicle defined by U-shaped edges 33 and 34 along walls 22 and 24, respectively, and a substantially straight edge 35 along roof portion 26 that extends transversely to the longitudinal axis of the vehicle 10.

As aforementioned, the enclosure member 16 comprises a pair of side walls 28 and 30 and a roof portion 32. The edges 36 and 37 of side walls 28 and 30 and the forward edge 38 of the roof portion 32 are designed and shaped so they are complementary to the edges 33 and 34 of the side wall 22 and 24 and the edge 35 of the roof portion 26. Thus, when the enclosure member 16 is in the closed position of FIGS. 1 and 3, the enclosure member 16 completely closes the cut-out section of the rear body section to provide the van configuration. In this regard, it will be noted that the side walls 28 and 30 of the enclosure member 16 are pivotally connected to the upper rear corners of the body side walls 22 and 24 by hinge means 40 so as to provide for movement between the closed position shown in FIGS. 1 and 3, and the open position shown in FIGS. 2 and 5.

Figure 3:
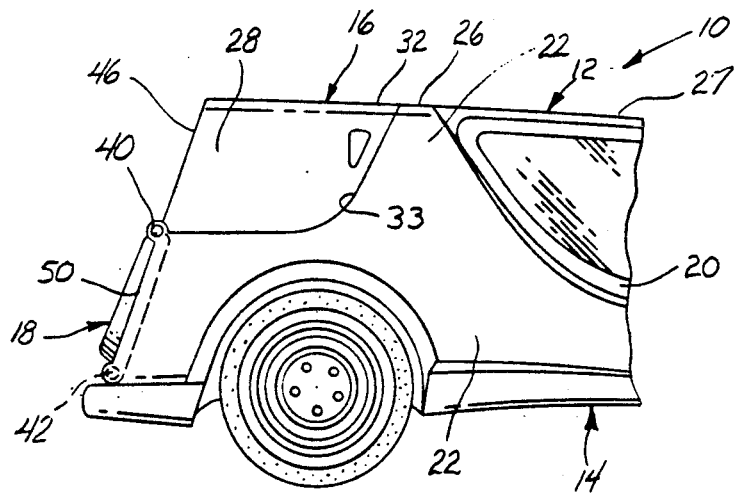
FIG. 3 is a side view of a rear portion of the vehicle of the present invention as shown in FIG. 1 showing the enclosure member in the closed position and the tailgate in the raised position.

As can be seen in FIGS. 1 and 3, when the enclosure member 16 is in the closed position, the roof portion 32 is vertically spaced above the body floor portion 21 and fits flush with the roof portion 26 while the side wall portions 28 and 30 fit flush with the side walls 22 and 24, respectively. A latching means (not shown) for securing the enclosure member 16 to the body section 14 when in the closed position is also provided. The latching means can be a part of the enclosure member 16 or part of the body section 14 and, when unlatched, it serves to allow the enclosure member 16 to pivot from the closed position to the open position.

Figure 4:
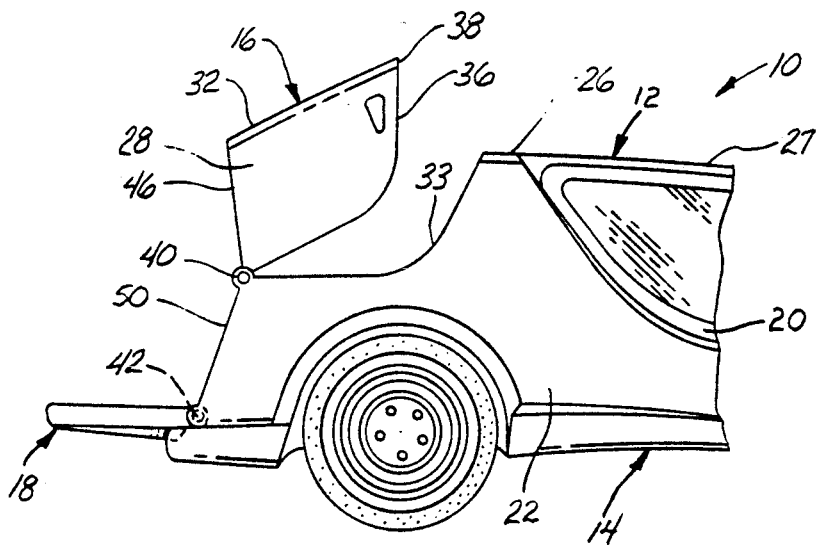
FIG. 4 is a view similar to that seen in FIG. 3 but shows the vehicle of the present invention being converted from the closed van configuration to the open pickup truck configuration with the enclosure member located in an intermediate position as it pivots between the closed position and the open position and also shown the tailgate in the lowered position.

The tailgate 18 is pivotally connected to a lower rear area of each of body side walls 22 and 24 by horizontally aligned and laterally spaced hinge means 42. The hinge means 42 permit pivotal movement of the tailgate 18 between a raised position, as shown in FIGS. 1 and 3, and a lowered position, as shown in FIGS. 4 and 5. When in the raised position, the tailgate 18 is substantially vertically orientated and is adjacent to and fits flush with the body side walls 22 and 24. The tailgate 18 includes a plateglass window 44 which serves as a transparent partition to close the space between the tailgate 18 and the roof 32 of the enclosure section 16 when window 44 is in the raised position. The window 44 is adapted to be moved downwardly and be stored inside of the tailgate 18 when the latter is to be moved to the lowered position. A tailgate latching means (not shown) is carried by the tailgate 18 for latching to the body side walls 22 and 24 when in the raised position. As is conventional, the latching means is unlatched when the tailgate 18 is to be pivoted to the lowered position.

As can be seen in FIG. 1, when the enclosure member 16 is in the closed position and the tailgate 18 in the raised position, the enclosure member 16 and the tailgate 18 cooperate with the rear body section 14 to define the enclosed cargo space of the van configuration. In other words, in the van configuration, the roof portion 26 of the body section 14, the cab section's roof 27 and the roof portion 32 of the enclosure member 16 form the van's roof while the side walls 22 and 24 cooperate with the side wall portions 28 and 30 to form the side walls of the van configuration. A seal means (not shown) may be used to fit between the side walls and roof portion of the cut-out section and the enclosure member 16, for sealing the enclosed cargo space. In the van configuration, the tailgate 18 serves as an access means for loading or unloading cargo from the enclosed interior cargo space. To this end, the plateglass window 44 can be lowered and the tailgate 18 moved to the lowered position at which time cargo may be loaded or unloaded. When loading is completed, the tailgate 18 can be moved to the raised position and the plateglass window 44 is raised to prevent further access to the enclosed cargo space 34.

As mentioned above, the vehicle 10 is convertible from the closed van configuration of FIGS. 1 and 3 to the pickup truck configuration of FIGS. 2 and 5. This can be realized by first lowering the glass window 44 followed by pivoting the tailgate 18 about hinge means 42 from the raised position to the lowered position, as shown in FIG. 4. Next, the latching means of the enclosure member 16 is unlatched and the enclosure member 16 is pivoted in a counterlocking direction about hinge means 40 through the intermediate position of FIG. 4 and from the closed position of FIG. 3 to the open position of FIG. 5. The tailgate 18 is maintained in the lowered position by a suitable stop means (not shown) such as a linkage mechanism between the tailgate 28 and the body side walls 22 and 24, while the enclosure member 16 may be maintained in the open position by having the rear edges 46 and 48 of the enclosure 16 section engage the corresponding rear edges 50 and 52 of the body side walls 22 and 24 and by a latching means (not shown). Together the body section 14 and the enclosure member 16 cooperate to provide the open cargo bed of the pickup truck configuration. This has the effect of providing a pickup truck configuration and the enclosure section 16, in the open position, acts to lengthen the cargo-carrying area of the vehicle longitudinally. In this regard, the body side walls 22 and 24 cooperate with the wall portions 28 and 30 of the enclosure member 16 to form side walls of increased length and, similarly, the body floor portion 21 cooperates with the inverted roof portion 26 to form a floor of increased longitudinal length.

It will be noted that the tailgate 18 acts as an auxiliary support means for supporting the enclosure member 16 when in the open position as seen in FIG. 5. By helping support the enclosure member 16, the tailgate 18 permits the enclosure member 16 to carry increased cargo weight.

As mentioned above, the vehicle 10 can be returned from the pickup truck configuration of FIGS. 2 and 5 to the van configuration of FIGS. 1 and 3. Thus, if the enclosure member 16 is being maintained in the open position by a latching means, the latter would be unlatched to permit the enclosure member 16 to pivot clockwise from the FIG. 5 position towards the FIG. 4 position and finally to the closed position of FIG. 3. The tailgate 18 is then pivoted from the lowered position to the raised position seen in FIG. 3 and the window 44 raised as aforementioned. This has the effect of transforming the vehicle from the pickup truck configuration to the van configuration seen in FIGS. 1 and 3.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A vehicle convertible from a first configuration having an open cargo bed of increased longitudinal length, the vehicle comprising:
   a body section having a roof and side walls;
   an enclosure member connected to the body section for movement between a closed position wherein the vehicle has the first configuration and an open position wherein the vehicle has the second configuration;
   said enclosure member being a continuation of said body section whereby said enclosure member meets substantially flush with said roof and side walls of said body section and is supported by said body section in both the open position and the closed position;
   access means connected to the rear of the body section for movement between a raised position and a lowered position; and
   means located at the rear of said body section for pivotally connecting said enclosure member to said body section whereby movement of said enclosure member from the closed position to the open position results in the enclosure member serving as a cargo carrying member and increasing the longitudinal length of the cargo bed.

2. The vehicle as set forth in claim 1 wherein the access means for accessing the enclosed cargo space comprises a tailgate pivotally connected to the body section.

3. The vehicle as set forth in claim 1 wherein the access means for accessing the enclosed cargo space comprises a window connected to a tailgate pivotally connected to the body section.

4. A vehicle convertible from a first configuration having an enclosed cargo bed to a second configuration having an open cargo bed of increased longitudinal length, the vehicle comprising:
   a body section having a roof and side walls;
   an enclosure member connected to the body section for movement between a closed position wherein the vehicle has the first configuration and an open position wherein the vehicle has the second configuration;
   said enclosure member being a continuation of said body section whereby said enclosure member meets substantially flush with said roof and side walls of said body section and is supported by said body section in both the open position and the closed position;
   access means connected to the rear of the body section for movement between a raised position and a lowered position; and
   means located at the rear of said body section at an intermediate height along said access means for pivotally connecting said enclosure member to said body section whereby movement of said enclosure member from the closed position to the open position results in the enclosure member serving as a cargo carrying member and increasing the longitudinal length of the cargo bed.

5. A vehicle convertible from a first configuration having an enclosed cargo bed to a second configuration having an open cargo bed of increased longitudinal length, the vehicle comprising:
   a body section having a roof and side walls;
   an enclosure member connected to the body section for movement between a closed position wherein the vehicle has the first configuration and an open position wherein the vehicle has the second configuration;
   said enclosure member being a continuation of said body section whereby said enclosure member meets substantially flush with said roof and side walls of said body section and is supported by said body section in both the open position and the closed position;

a tailgate connected to the rear of the body section by a first pivotal connection for movement between a raised position and a lowered position; and a second pivotal connection located at the rear of said body section above said first pivotal connection for pivotally connecting said enclosure member to said body section whereby movement of said enclosure member about said second pivotal connection from the closed position to the open position results in the enclosure member serving as a cargo carrying member and increasing the longitudinal length of the cargo bed.

6. The vehicle as set forth in claim 1 wherein the body section has an open rear end to a cab and passengers of the vehicle have complete bodily access from the vehicle cab to the vehicle cargo bed via said open rear end without having to exit said vehicle when the enclosure member is either in the closed position or the open position.

7. The vehicle as set forth in claim 4 wherein the access means for accessing the enclosed cargo bed comprises a tailgate pivotally connected to the body section.

8. The vehicle as set forth in claim 4 wherein the access means for accessing the enclosed cargo bed comprises a window connected to a tailgate pivotally connected to the body section.

* * * * *